(12) United States Patent
Holroyd et al.

(10) Patent No.: US 9,020,778 B2
(45) Date of Patent: Apr. 28, 2015

(54) SENSOR BASED MEANS OF MONITORING THE MECHANICAL CONDITION OF ROTATING MACHINERY THAT OPERATES INTERMITTENTLY

(75) Inventors: Trevor James Holroyd, Storrington (GB); David Lin, Storrington (GB)

(73) Assignee: Kittiwake Holroyd Limited (GB)

( * ) Notice: Subject to any disclaimer, the term of this patent is extended or adjusted under 35 U.S.C. 154(b) by 591 days.

(21) Appl. No.: 13/286,917

(22) Filed: Nov. 1, 2011

(65) Prior Publication Data

US 2012/0109580 A1    May 3, 2012

(30) Foreign Application Priority Data

Nov. 3, 2010   (GB) .................................. 1018542.9

(51) Int. Cl.
G06F 15/00 (2006.01)
G01B 3/00 (2006.01)
G01H 1/12 (2006.01)
G01M 13/02 (2006.01)

(52) U.S. Cl.
CPC ................. G06F 15/00 (2013.01); G01H 1/12 (2013.01); G01M 13/028 (2013.01)

(58) Field of Classification Search
CPC ........ G01H 1/003; G01H 1/12; G01L 23/225; G01M 13/028; G01M 13/045; G01N 29/14; G01N 29/449; G06F 15/00
USPC ........... 702/44, 56, 69, 75, 79, 176, 179, 182, 702/183, 185, 189, 193, 33; 700/21; 340/679; 73/659, 660
See application file for complete search history.

(56) References Cited

U.S. PATENT DOCUMENTS

| 5,176,032 | A | 1/1993 | Holroyd et al. |
| 6,567,709 | B1 * | 5/2003 | Malm et al. ..................... 700/21 |
| 2002/0140566 | A1 * | 10/2002 | Holroyd ....................... 340/679 |
| 2012/0296582 | A1 * | 11/2012 | Hedin ............................. 702/56 |

FOREIGN PATENT DOCUMENTS

| CN | 101614555 | 12/2009 |
| EP | 0 363 785 | 4/1990 |
| JP | 58-55824 | 4/1983 |

OTHER PUBLICATIONS

Search Report which issued in connection with corresponding GB Patent Application No. 1018542.9 on Jun. 18, 2012.

* cited by examiner

*Primary Examiner* — John H Le
(74) *Attorney, Agent, or Firm* — Clark Hill PLC

(57) ABSTRACT

A method of monitoring the mechanical condition of a machine in which statistically significant measurements on a characteristic signal are made over a period of time which can include interruptions and variations in the operation of the machine giving rise to uncharacteristic signals and the processing of the signal during the statistically significant measurement automatically excludes those parts of the signal associated with interruptions and variations in the operation of the machine. The invention also includes apparatus for carrying out the above method including a preamplifier, adapted to provide output to a further amplifier, adapted to provided output to dynamic enveloping circuitry, adapted to provide an output to an analogue to digital converter, adapted to provide an output to a digital micro-electronic device.

14 Claims, 7 Drawing Sheets

Outline schematic of apparatus according to the present invention

Apparatus (1)

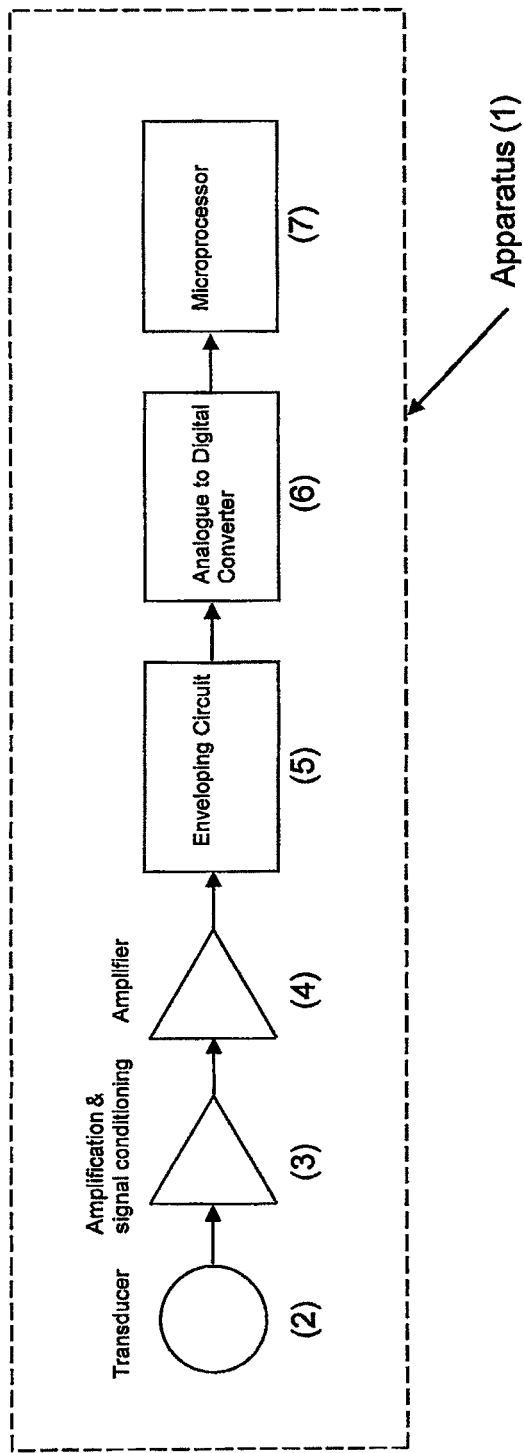
Figure 1 Outline schematic of apparatus according to the present invention

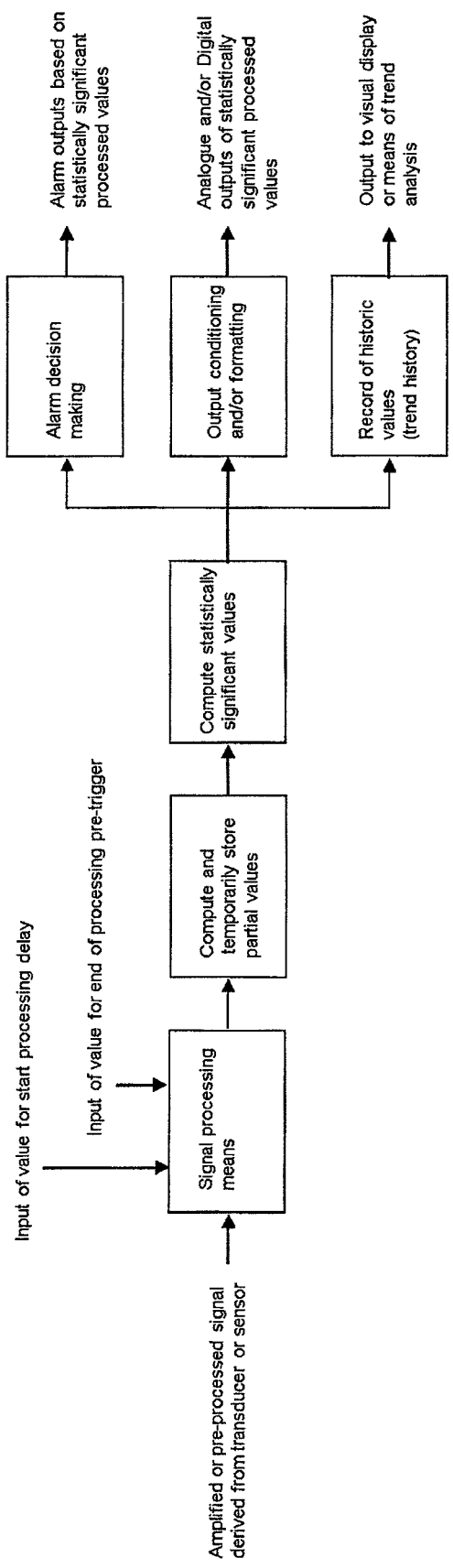
Figure 2 (a) Outline of the scheme within the microprocessor according to the present invention using processed signal values to recognise when machine is running

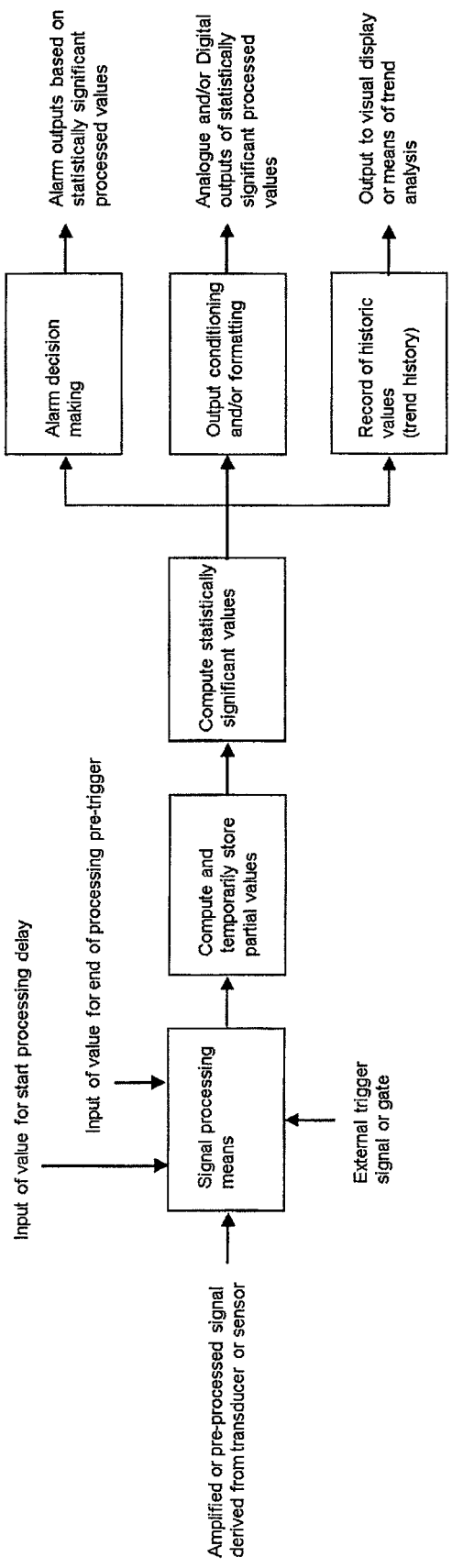
Figure 2(b) Outline of the scheme within the microprocessor according to the present invention using external trigger or gate to recognise when machine is running

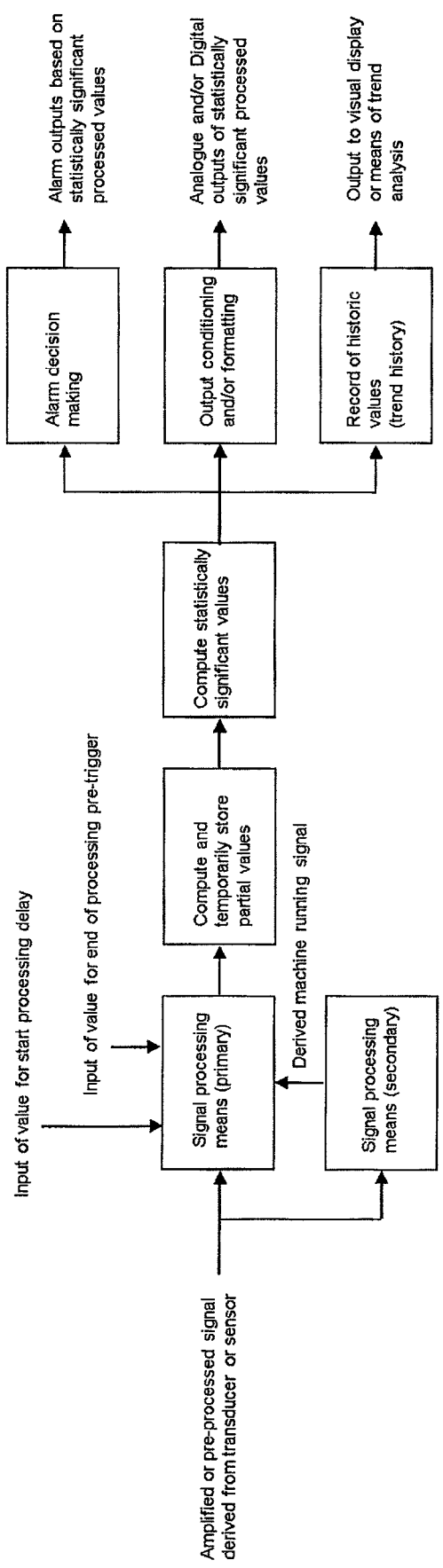
Figure 2(c)  Outline of the scheme within the microprocessor according to the present invention using separately processed signal values to recognise when machine is running Schematic of present invention using processed signal values to recognise when machine is running Schematic of present invention using external trigger or gate to recognise when machine is running Schematic of present invention using separately processed signal values to recognise when machine is running

SENSOR BASED MEANS OF MONITORING THE MECHANICAL CONDITION OF ROTATING MACHINERY THAT OPERATES INTERMITTENTLY

This application claims the benefit of British application Serial No. 1018542.9 filed 3 Nov. 2010.

FIELD OF THE INVENTION

The present invention relates to a method and an apparatus for processing of the information contained in signals derived from sensing means applied to the monitoring of machinery and is particularly of interest for processing signals from sensors or transducers used to monitor machinery which operates intermittently whether in a regular operating cycle or for variable or random durations. Whilst the sensing means could be based on any technology responsive to changes in the mechanical state or condition of machinery, typical sensing technologies would include means to detect acoustic emissions or stress waves, ultrasonic activity, noise signals and mechanical vibrations.

BACKGROUND OF THE INVENTION

Acoustic Emission or stress wave activity is most commonly associated with the high frequency component of structure borne elastic waves associated with operating machinery and is produced as a result of friction, impacts, cavitation, metal removal, crack growth, plastic deformation and other energy loss processes taking place during the operation of the machinery.

Noise signals are airborne sound waves associated with operating machinery and are produced as a result of out of balance forces, friction, impacts, cavitation, metal removal, crack growth, plastic deformation and other energy loss processes taking place during the operation of the machinery.

Ultrasonic activity is similar to noise but specifically refers to that part of the activity occurring at frequencies above the audible range (say above 20 kHz). Sometimes the term ultrasonics is used to denote the detection of structure borne activity at ultrasonic frequencies in which case it is largely interchangeable with the terms Acoustic Emission and stress waves.

Mechanical vibrations within materials and structures are associated with operating machinery and are produced as a result of out of balance forces, friction, impacts, cavitation, metal removal, crack growth, plastic deformation and other energy loss processes taking place during the operation of the machinery.

The early detection of machinery faults enables maintenance to be better planned and degrading machinery to be serviced, repaired or replaced with a minimum of disruption and cost. Whilst there are many ways in which the electrical signals form appropriate transducers and sensors can be processed for the purpose of machinery condition monitoring a common requirement is to characterise the sensor signal over a sufficiently long period to allow a representative assessment to be made. A difficulty therefore arises in determining the mechanical condition of machinery by monitoring sensor signals where machinery may operate for a period of time that is not sufficiently long to allow a representative measurement or assessment of machine condition to be made.

A difficulty in satisfactorily monitoring intermittently operating machinery is that there may be significant periods during which the machine speed is changing since neither the starting of a machine nor the stopping of a machine can be instantaneous. Furthermore depending on the nature of the machine there may also be actions associated with the starting and stopping process (e.g. brake, clutch and latch actions) which give rise to the generation of sensor signals which are not representative of signals generated during steady state operation.

In prior art methods of processing electrical signals responsive to the mechanical condition of operating machinery the electrical signals derived from one or more appropriate sensors or transducers are conditioned and processed in a wide variety of ways. The raw, conditioned or preliminarily processed electrical signals can be further processed in either the frequency or time domains as part of the process of assessing the mechanical condition of a machine.

In the frequency domain it is not untypical to ascribe certain frequencies or frequency bands as being related to fault mechanisms. For example it is not unusual to relate specific detected frequencies in the frequency spectrum of either the amplified vibration signal or the enveloped vibration or Acoustic Emission signal to pre-calculated defect repetition frequencies such as those related to the rolling element passing over a defect in the inner race or outer race of a bearing for example. In a similar way detected frequency components may be related to gear meshing frequencies. However analysis of such defect or defect repetition frequencies relies upon the precise relative timing of signal features throughout the whole of the signal period being processed and the presently disclosed invention is not considered appropriate to such frequency analysis.

Accordingly the present invention is concerned with those signal processing methods which are carried out in the time domain and do not rely specifically on the precise relative timing of features throughout the whole of the signal period being processed. Examples of time domain signal processing methods include but are not limited to rms, mean level, average level, average peak, crest factor, standard deviation, variance and kurtosis. Additional proprietary methods of time domain signal processing are also in widespread use and are included within the scope of the presently disclosed invention. Such time domain signal processing methods are not instantaneous but involve the processing of electrical signals over a finite period of time and hence for machinery monitoring purposes the machine must operate over this finite period of time whilst sensor signals are either stored or measurements are made on them as they are detected.

In practice an adequate period of machine running is required to (a) ensure that all relevant aspects of the moving and load bearing parts of the machine are included in the signal generation and (b) allow a statistically significant signal characterisation to be made of the detected signal. By way of example, in the case of a machine involving full rotation through 360 degrees it is not unusual for the signal measurement to be carried out over a period encompassing several complete revolutions of the machine part of interest.

Time domain methods of monitoring the mechanical condition of machinery that operates in a continuously rotating manner are well established using Acoustic Emission transducers and sensors, ultrasonic transducers and sensors, accelerometers and microphones, for example. Typically detected electrical signals are continuously inputted into a processing unit which has one or more outputs or displays of the signal characterisations of interest. These processed outputs may be interpreted in terms of their present values or from the trends that are revealed by observing changes in these values over time. They may also be used for providing warning or alarm outputs.

It is a common observation that with each of the above mentioned sensing technologies the magnitude of the detected electrical signal is influenced by the speed of the operation of the machine as well as the mechanical condition. In general signal magnitudes increase with increasing machine speed. Because of the influence of speed on the detected electrical signals it is generally the case that the most useful part of the sensor electrical signal from which to assess machine condition is that part associated with steady state running.

However the duration of a period of steady state running of an intermittently operating machine (excluding for example start-up, slow down, operational changes and stopped periods) may not allow a signal of sufficient duration to be detected to allow an effective assessment of mechanical condition to be made.

Hence a first difficulty in monitoring intermittently operating machinery is the presence of periods of time when the signal being detected does not correspond to steady state operation. A second difficulty in monitoring intermittently operating machinery occurs when some or all of the machine operations only have periods of steady state operation that are of too short a duration to allow an effective measurement related to the mechanical condition of the machine to be made.

To overcome these difficulties it can sometimes be arranged for the machine to be specially run in a continuous mode for an adequate period to allow a signal to be detected having a duration long enough to allow an effective measurement related to the mechanical condition of the machine to be made. Alternatively where some of the machine operations are of sufficiently long duration for an effective measurement to be made special arrangements may be made to only take a measurement during these longer operations.

Object of the Invention

A basic object of the present invention is to provide an improved method and apparatus for processing of the information contained in signals derived from sensing means applied to the monitoring of intermittently operating machinery including machinery that has only short periods of running compared to the signal duration required to make an effective condition monitoring measurement.

A further object of the present invention is to provide a simple more direct method and apparatus to overcome the identified difficulties of monitoring intermittently operating machinery without the need for the monitoring to necessarily include any individual periods of the machine operating in a steady state which are individually of sufficiently long duration for an effective measurement to be made during steady state running. Yet a further object of the present invention is to provide a simple more direct method and apparatus for the automatic identification of those parts of the machines operation when it is operating in a steady state and when it is not operating in a steady state. In combination these two aspects of the present invention make it possible to have continuously active sensor signal detection and time domain signal processing that automatically processes incoming sensor electrical signals such that only steady state operating conditions are included in the signal processing method to allow an effective measurement or successive effective measurements to be made which would ordinarily require the signal from a period of steady state running that is longer than one, more or all of the constituent periods of signal from steady state running that in combination represent a signal period long enough to allow the signal processing method chosen to make an effective or statistically significant measurement. This is particularly relevant to permanently installed monitoring systems.

SUMMARY OF A FIRST ASPECT OF THE INVENTION

According to a first aspect of the invention, there is provided a method of monitoring the mechanical condition of a machine in which statistically significant measurements on a characteristic signal are made over a period of time which can include interruptions and variations in the operation of the machine giving rise to uncharacteristic signals and the processing of the signal during the statistically significant measurement automatically excludes those parts of the signal associated with interruptions and variations in the operation of the machine, whilst preferred or optional features are defined in sub-claims 2-15.

SUMMARY OF A SECOND ASPECT OF THE INVENTION

According to a second aspect of the invention, there is provided apparatus for carrying out the method of the first aspect, comprising:
(i) a preamplifier, adapted to provide output to
(ii) a further amplifier, adapted to provided output to
(ii) dynamic enveloping circuitry, adapted to provide an output to
(iv) an analogue to digital converter, adapted to provide an output to
(v) a digital micro-electronic device.

The present invention provides a simple method of processing sensor signals from intermittently operating machinery which allows periods of steady state running to be automatically identified by making use of a characteristic change in a detected sensor signal or an externally generated signal in combination with pre-determined time periods selected and implemented so as to allow the separation of a part of the signal associated only with steady state running and incorporating time domain signal processing means applied to such automatically selected steady state running parts of the signal which is able to accommodate interruptions and resumptions of the incoming signal without adversely affecting the signal characterisation involved in the signal processing other than for interruptions and resumptions in the signal characterisation process so as to produce a resultant signal characterisation after an accumulation of periods of steady state running representing in aggregate an appropriate period for a statistically significant measurement to be made where said signal characterisation is equivalent to that which would have been produced as a result of characterisation of the signal for an appropriate period of continuous steady state operation.

By way of example the signals may correspond to the Acoustic Emission, stress waves, noise, ultrasonics or vibration generated by an operating machine and detected by a suitable transducer, microphone, accelerometer or other suitable sensor, sensing element or apparatus.

The sensor signal characterisation may be in terms of one or more parameters derived from the time domain signal such as root mean square, signal energy, mean level, average level, average rectified level, average peak, crest factor, standard deviation, variance, kurtosis and other proprietary methods.

The characteristic change in a detected sensor signal used to recognise the starting of the machine may be associated with a change, such as an increase, in a sensor signal or a resultant change in any derived sensor signal characterisation.

The characteristic change in a detected sensor signal used to recognise the stopping of the machine may be associated with a change, such as a decrease, in a sensor signal or a resultant change in any derived sensor signal characterisation.

The characteristic change in an externally generated signal used to recognise the starting and stopping of the machine may be associated with easily detectable changes such as increases and decreases in the external signal level.

The pre-determined time periods may include a delay period after the detection of the starting of the machine operation to allow for the machine to attain steady state operation before signal characterisation resumes.

The pre-determined time periods may include a rejection period to inhibit changes to the signal characterisation prior to the detection of the stopping of the machine operation to allow for any anticipated changes in the machine operation before detection of machine operation stopping.

The sensor signal characterisation may be conducted over shorter samples of the sensor signal than would otherwise be required to produce a statistically significant measurement and the signal characterisation interrupted and resumed in such a way as to carry forward from one period of steady state running to another values derived from the sensor signal useful to an on-going signal characterisation encompassing an appropriate aggregate signal duration at the steady state running condition to produce a statistically significant measurement.

The sensor signal characterisation may be conducted on a digitally stored sample of the sensor signal or a derivative or derivatives of it covering a period of steady state running of an appropriate duration at the steady state running condition to produce a statistically significant measurement comprising an aggregate of shorter samples of the sensor signal than would otherwise be required to produce a statistically significant measurement.

The signal characterisation may be performed within the same housing as the sensing means.

In the specific case of machinery which involves rotating elements it should be noted that the present invention is equally applicable to machinery where its periods of operation involves only partial rotation of its rotating elements (i.e. rotations of less than 360 degrees).

A number of bench and shop-floor trials during the normal operation of intermittent machinery have shown that the presently disclosed invention does enable such machinery to be successfully monitored with similar sensor signal characterisations being obtained during both interrupted and continuous operation during periods of signal characterisation.

BRIEF DESCRIPTION OF THE DRAWINGS

The various aspects of the present invention will be more fully described for the case of Acoustic Emission detection by way of example with reference to the accompanying drawings in which:—

FIG. 1 is a schematic diagram of apparatus in accordance with the second aspect for processing Acoustic Emission signals according to the method of the first aspect of the present invention. (Note that this shows the signal being processed as the envelope but the method could equally be applied to the amplified oscillatory AE signal without the need for an enveloping circuit.);

FIG. 2a is a schematic diagram of components within the microprocessor using processed signal values to recognise when the machine is running;

FIG. 2b is a schematic diagram of components within the microprocessor using external trigger or gate to recognise when the machine is running.

FIG. 2c is a schematic diagram of components within the microprocessor using separately processed signal values to recognise when the machine is running.

DETAILED DESCRIPTION OF THE PREFERRED EMBODIMENT

Figure 3A:
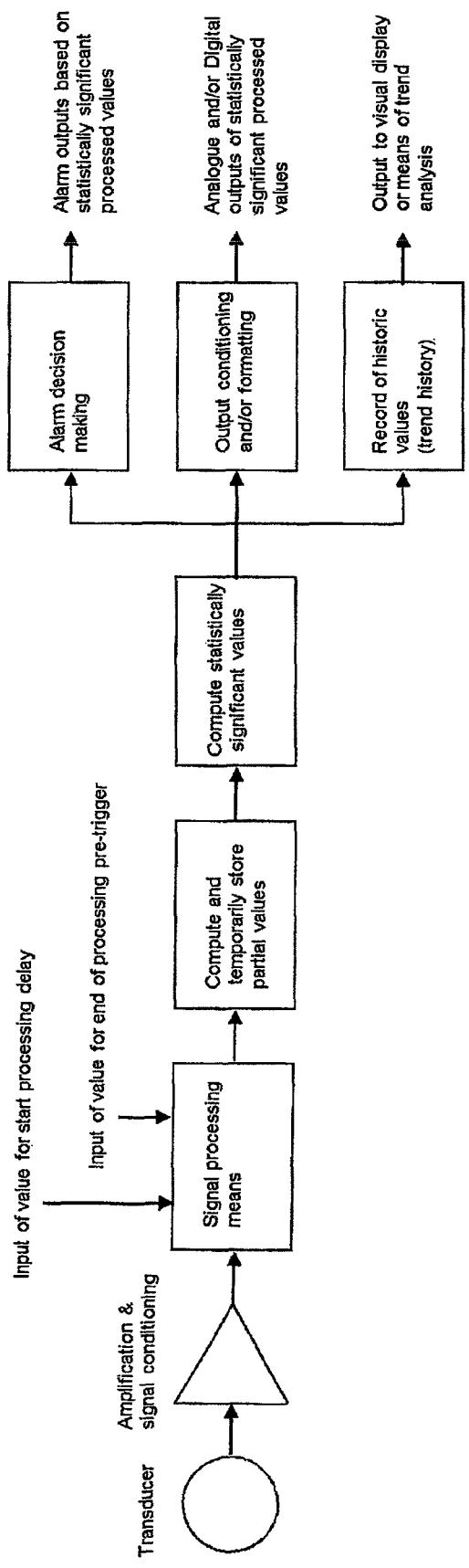
FIG. 3a is a schematic diagram showing the use of processed signal values to recognise when the machine is running.

An apparatus 1 for processing Acoustic Emissions to recognise features indicative of variations in the mechanical condition of slowly rotating machinery is shown in FIG. 1. The apparatus 1 comprises a transducer 2 which is acoustically coupled to a machine which provides the source of Acoustic Emissions (also known as stress waves or sometimes structure borne ultrasonics). These Acoustic Emissions are commonly generated as a result of impacts and frictional processes within the machine due to mechanical distress or mechanical degradation. The transducer 2 is arranged to detect the Acoustic Emissions generated by or in the machine and produce an electrical signal dependent upon the Acoustic Emission activity detected. The transducer 2 is commonly a piezo-ceramic element although more than one transducer element may be simultaneously used or combined. Other suitable types of Acoustic Emission transducer include piezo-electric plastics, capacitative transducers, micromachined silicon sensors, electromagnetic transducers and laser interferometers.

The electrical signal produced by the transducer 2 is supplied to the preamplifier 3. The preamplifier amplifies the electrical signal and may incorporate filtering to select the required frequencies of operation. The preamplified electrical signal is then supplied to a further amplifier 4. The output of the amplifier 4 is supplied to dynamic enveloping circuitry 5 which may have either a logarithmically or linearly scaled output in response to its input signal. This output signal is digitised by an Analogue to Digital Converter 6 and further processed in a digital micro-electronic device such as a microprocessor 7.

Figure 3B:
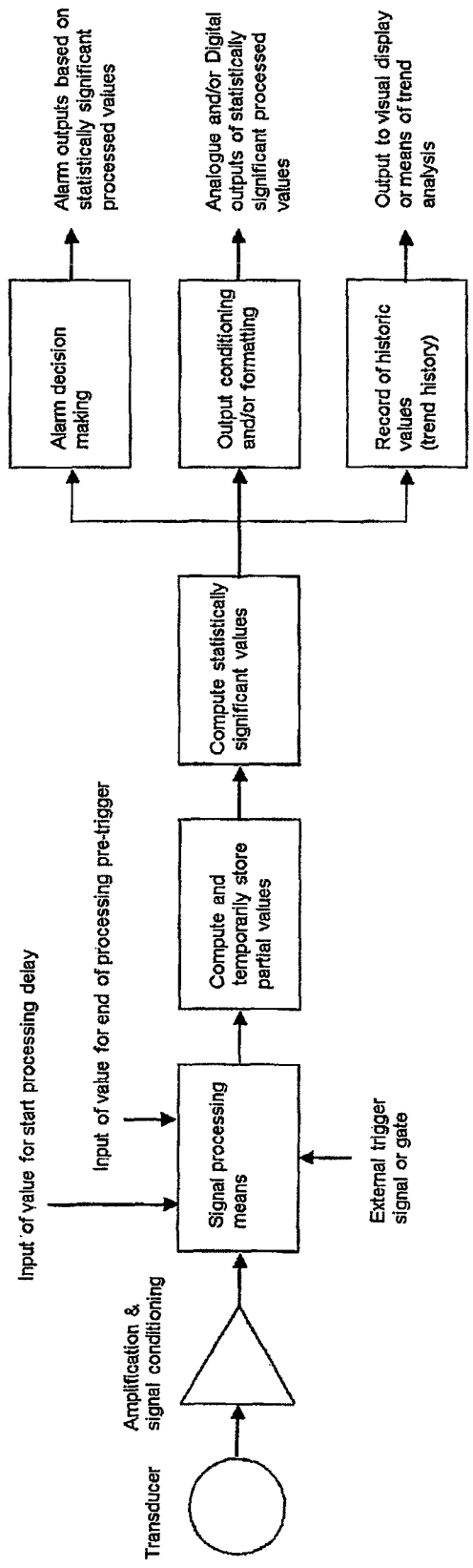
FIG. 3b is a schematic diagram showing the use of an external trigger or gate to show when the machine is running.
Figure 3C:
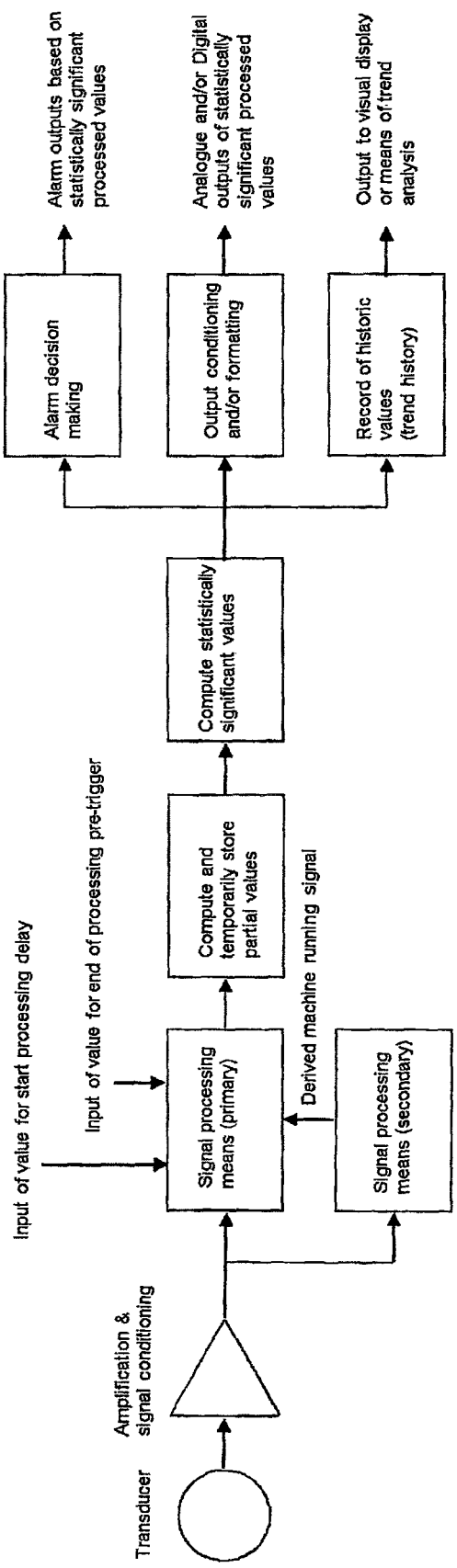
FIG. 3c is a schematic diagram showing the use of separately process signal values to recognise when the machine is running.

The signal is processed in the microprocessor 7 according to the scheme outlined in FIG. 3 and consists of a number of stages:

A first stage is the detection of the machine start which is achieved by processing of the numerical values representative of the dynamically enveloped signal and the recognition of the signal exceeding a pre-determined value or threshold level which starts the pre-set time delay period at the end of which the signal is required to be still above the pre-determined threshold level for the next stage to commence. As an alternative approach to machine starting the sensor also has provision for an external electrical input which then triggers the pre-set time delay.

A second stage comprises two parts. One part is the characterisation of the dynamic envelope signal in terms of an overall signal average (referred to as dB Level) and the proprietary signal parameter Distress carried out over signal durations of 512 msec and stored temporarily in memory. The second part is the recognition of the end of steady state running which is achieved by recognising multiple consecutive signal samples over a period of 128 msecs which are lower than the pre-determined threshold level. As an alternative approach to identifying machine stopping the sensor also has provision for an external electrical input.

A third stage is the deletion of the most recent temporarily stored values which were calculated from parts of the dynamic envelope signal occurring within the pre-set rejection period prior to the detection of machine stopping.

A fourth stage is the combination of a total of 20 temporarily stored values of each signal characterisation which is in total representative of 10.24 seconds of steady state running to produce a single characterisation of dB Level and a single characterisation of Distress.

A fifth stage comprises using the resultant characterised values of Distress and dB Level as an input into an alarm decision process. Newly calculated values of Distress and dB Level are compared to their respective pre-set alarm levels. If there are 6 consecutive newly calculated values of Distress or dB level where each is representative of 10.24 seconds of steady state running then the alarm condition is satisfied and a digital output from the microprocessor changes state form a normally high level to a low level.

A sixth stage comprises using the resultant characterised values of Distress and dB Level to build a historic trend of values which can be used and interpreted in terms of machine deterioration. To reduce the number of values present in such a trend and to increase the significance of the values forming it, the trend is of the highest values which were present or exceeded for six consecutive calculations within a 24 hour period.

A seventh stage is analogue outputs in terms of updated DC levels of the successive calculations after every 10.24 seconds of steady state machine operation of Distress and dB level values.

In order to successfully apply the above apparatus/methodology some details of the machines operation and the associated sensor and/or external electrical signals is required. This may be generally described as a set-up phase although it is acknowledged that such a set-up phase may not be required prior to each new application since the set-up criteria may be substantially equivalent on substantially similar machinery being operated in a similar manner. In particular for the currently described embodiment a knowledge of the time profile of the detected sensor signal magnitude is desired.

To simplify such a set-up phase the apparatus in this preferred embodiment can be run in a set up mode where the apparatus communicates directly with a (portable) PC which captures and displays the time profile of the detected sensor signal magnitude. Observation and/or analysis of the resulting waveform allows the range of signal levels associated with steady state running to be determined as well as that for the machine when stopped. From this knowledge an intermediate value can be chosen as a threshold level which is used to recognise machine starting and machine stopping to be automatically recognised. In addition observation and/or analysis of the same captured waveform allows the range of times associated with machine start up prior to achieving a steady state running and the range of time associated with machine slow down prior to machine stopping to be determined. With this knowledge appropriate times for the start up delay and the slow down rejection period can be chosen. The selected threshold level, start up delay and rejection period can then be communicated from the PC to the apparatus where they can be stored in non-volatile memory. Following this the apparatus can be changed from its set-up mode into its normal stand-alone monitoring mode and the PC can be disconnected.

The following shows tabulated values of Acoustic Emission signal characterisations of dB Level and Distress® for measurements taken according to the present invention on part of the main X-axis drive on a stacker crane in an automated warehouse where the stacker crane repeatedly stopped and started according to its workload demand. The tabulated values of dB Level and Distress® result from the characterisation of a 10.24 second period of detected signal according to FIG. 1. Observation of the time and date stamp accompanying each pair of Acoustic Emission signal characterisations allows those which were made consecutively during periods of continuous machine operation to be distinguished from those which involved at least one stop and start during the 10 second measurement period.

dB Level is a logarithmic representation of the average signal level detected over a 10 second period.

Distress® is a proprietary characterisation of the signal detected over the same 10 second period as the dB level signal characterisation.

Stacker
Distress 3, dB 26, Mar. 8, 2010 12:16:02 Continuous
Distress 3, dB 24, Mar. 8, 2010 12:15:52 Continuous
Distress 3, dB 24, Mar. 8, 2010 12:15:42 Continuous
Distress 3, dB 26, Mar. 8, 2010 12:15:31 Interrupted
Distress 3, dB 24, Mar. 8, 2010 12:15:00 Continuous
Distress 3, dB 26, Mar. 8, 2010 12:14:50 Interrupted
Distress 3, dB 25, Mar. 8, 2010 12:14:18 Interrupted
Distress 3, dB 24, Mar. 8, 2010 12:13:21 Continuous
Distress 3, dB 24, Mar. 8, 2010 12:13:11 Continuous
Distress 3, dB 25, Mar. 8, 2010 12:13:00 Interrupted
Distress 3, dB 24, Mar. 8, 2010 12:12:29 Interrupted
Distress 3, dB 24, Mar. 8, 2010 12:11:55 Continuous
Distress 4, dB 23, Mar. 8, 2010 12:11:45 Interrupted
Distress 3, dB 25, Mar. 8, 2010 12:10:51 Continuous
Distress 4, dB 23, Mar. 8, 2010 12:10:40 Continuous
Distress 4, dB 23, Mar. 8, 2010 12:10:30 Interrupted
Distress 3, dB 26, Mar. 8, 2010 12:10:02 Interrupted
Distress 3, dB 23, Mar. 8, 2010 12:09:52 Continuous
Distress 3, dB 23, Mar. 8, 2010 12:09:41 Not known

The invention claimed is:

1. A method of using a signal processor to identify a mechanical condition of a machine after receiving signals describing an operation of the machine from a sensor device; said method comprising;

having the signal processor receive the signals describing the operation of the machine;

said signals comprising characteristic signals and uncharacteristic signals;

said characteristic signals comprising information describing a steady state operation of the machine, and information describing interruptions of the operation of the machine, and information describing variations of the operation of the machine; and said uncharacteristic signals comprising information describing the mechanical condition of said machine;

having the signal processor make statistically significant measurements on the signals;

have the signal processor the signal to detect an interruption to said steady state of the machine;

upon detecting the interruption, for a pre-determined time having the signal processor exclude said information describing interruptions of the operation of the machine and said information describing variations of the operation of the machine from said signals; and having the signal processor identify said uncharacteristic signals and identify the mechanical condition of the machine.

2. A method as defined in claim 1, further comprising having the signal processor process the signals after a pre-specified period of time after the predetermined time is recognized as being satisfied.

3. A method as defined in claim 1, wherein the sensor device measures the vibration generated by the machine during its operation.

4. A method as defined in claim 1, wherein the sensor device measures the high frequency elastic waves being generated by the machine during its operation.

5. A method as defined in claim 1, wherein the sensor device measures the noise generated by the machine during its operation.

6. A method as defined in claim 1, wherein an external trigger satisfies said predetermined time to activate the signal processing being applied to the signal.

7. A method as defined in claim 6, wherein signal processing occurs after a pre-specified period of time after the external trigger or start of an external gate has been detected.

8. A method as defined in claim 6, wherein signal processing is stopped or not taken into account for a pre-specified minimum time prior to an external trigger or the end of an external electrical gate has been detected.

9. A method as claimed in claim 1, wherein the activity during the start and stop process is monitored using different signal processing to characterize different aspects of the machine condition including but not exclusively brake or clutch operations.

10. Apparatus for carrying out the method as claimed in claim 9, wherein various components are contained within a housing which also houses the sensor device which generates the characteristic signal from which statistically significant measurements are made.

11. A method as claimed in claim 1, wherein a provision to permit signal preview is provided, to enable sensor device setup.

12. A method as defined in claim 1, wherein rotational movement of the machine is involved.

13. A method of as defined in claimed 1, wherein linear movement(s) of the machine is/are involved.

14. The method of claim 1, wherein the step of having the signal processor make statistically significant measurements further comprises;
    having the signal processor process the signals into a derivative signal prior to excluding said information describing interruptions of the operation of the machine and said information describing variations of the operation of the machine from said signals.

* * * * *